United States Patent
Tanaka et al.

(10) Patent No.: US 7,383,395 B2
(45) Date of Patent: Jun. 3, 2008

(54) STORAGE DEVICE

(75) Inventors: Katsuya Tanaka, Tokyo (JP); Tetsuya Shirogane, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 487 days.

(21) Appl. No.: 10/973,298

(22) Filed: Oct. 27, 2004

(65) Prior Publication Data
US 2006/0047900 A1 Mar. 2, 2006

(30) Foreign Application Priority Data
Sep. 1, 2004 (JP) ............................. 2004-254509

(51) Int. Cl.
*G06F 13/00* (2006.01)
(52) U.S. Cl. .................. 711/141; 711/111; 711/112; 711/113; 711/114; 711/118; 710/240; 710/241; 710/309
(58) Field of Classification Search ........ 711/111–114, 711/118, 119, 141, 147, 148; 710/240, 241, 710/309
See application file for complete search history.

(56) References Cited

U.S. PATENT DOCUMENTS 6,108,752 A * 8/2000 VanDoren et al. .......... 711/117

| 2003/0110157 | A1 | 6/2003 | Maki et al. ............. 707/1 |
| 2003/0221062 | A1* | 11/2003 | Shimada ............ 711/114 |
| 2004/0117559 | A1* | 6/2004 | Glasco et al. ......... 711/141 |
| 2004/0139283 | A1* | 7/2004 | Arimilli et al. ........ 711/146 |
| 2005/0114592 | A1* | 5/2005 | Jin et al. ............. 711/113 |
| 2005/0228952 | A1* | 10/2005 | Mayhew et al. ........ 711/133 |

FOREIGN PATENT DOCUMENTS

JP 2001-344188 12/2001

* cited by examiner

*Primary Examiner*—Stephen C. Elmore
*Assistant Examiner*—Daniel Kim
(74) *Attorney, Agent, or Firm*—Mattingly, Stanger, Malur & Brundidge, PC

(57) ABSTRACT

A storage system is disclosed for performing control to match data among cache memories corresponding to shared volumes when multiple disk controllers containing cache memories are accessing shared volumes formed in the storage device. The storage system contains a switch for switching and connecting the multiple disk controllers containing cache memories, with a disk array containing the shared volumes capable of being commonly accessed from the multiple disk controllers. The switch performs exclusive access control of the multiple disk controllers' writing on the shared volumes, and performs control to match data other than modified data among the cache memories.

11 Claims, 19 Drawing Sheets

CHA0 CHANNEL ADAPTER

DKA0 DISK ADAPTER

FIG. 13

| SHARED VOLUME AREA NO. | START POINT MEMORY ADDRESS | END POINT MEMORY ADDRESS | CACHE STATUS |
|---|---|---|---|
| | | | |
| | | | |
| | | | |
| | | | |
| | | | |
| | | | |

Columns START POINT MEMORY ADDRESS and END POINT MEMORY ADDRESS are grouped as 1301. CACHE STATUS is 1302.

FIG. 14

| SHARED VOLUME AREA NO. | DKC0 | | | DKC1 | | | DKC2 | | |
|---|---|---|---|---|---|---|---|---|---|
| | TARGET ID | LUN | START POINT BLOCK ADDRESS | END POINT BLOCK ADDRESS | TARGET ID | LUN | START POINT BLOCK ADDRESS | END POINT BLOCK ADDRESS | TARGET ID | LUN | START POINT BLOCK ADDRESS | END POINT BLOCK ADDRESS |
| | 1401 | 1402 | 1403 | | | | | | | |
| | | | | | | | | | | |
| | | | | | | | | | | |
| | | | | | | | | | | |
| | | | | | | | | | | |
| | | | | | | | | | | |

FIG. 15

| 1501 | 1502 | 1503 | 1504 | | 1505 ACCESSING EXCHANGE (1) | | | | 1506 ACCESSING EXCHANGE (2) | | | |
|---|---|---|---|---|---|---|---|---|---|---|---|---|
| SHARED VOLUME AREA NO. | TARGET ID | LUN | START POINT BLOCK ADDRESS | END POINT BLOCK ADDRESS | R/W | OX-ID | S-ID | D-ID | R/W | OX-ID | S-ID | D-ID |
| | | | | | | | | | | | | |
| | | | | | | | | | | | | |
| | | | | | | | | | | | | |
| | | | | | | | | | | | | |
| | | | | | | | | | | | | |

F I G. 1 6

| EXCHANGE CURRENTLY IN PROGRESS | none | Read | Read | Write | Write |
|---|---|---|---|---|---|
| NEW EXCHANGE | Read or Write | Read | Write | Read | Write |
| DECISION RESULTS | Yes | Yes | No | No | No |

1601　1602　1603

F I G. 1 9
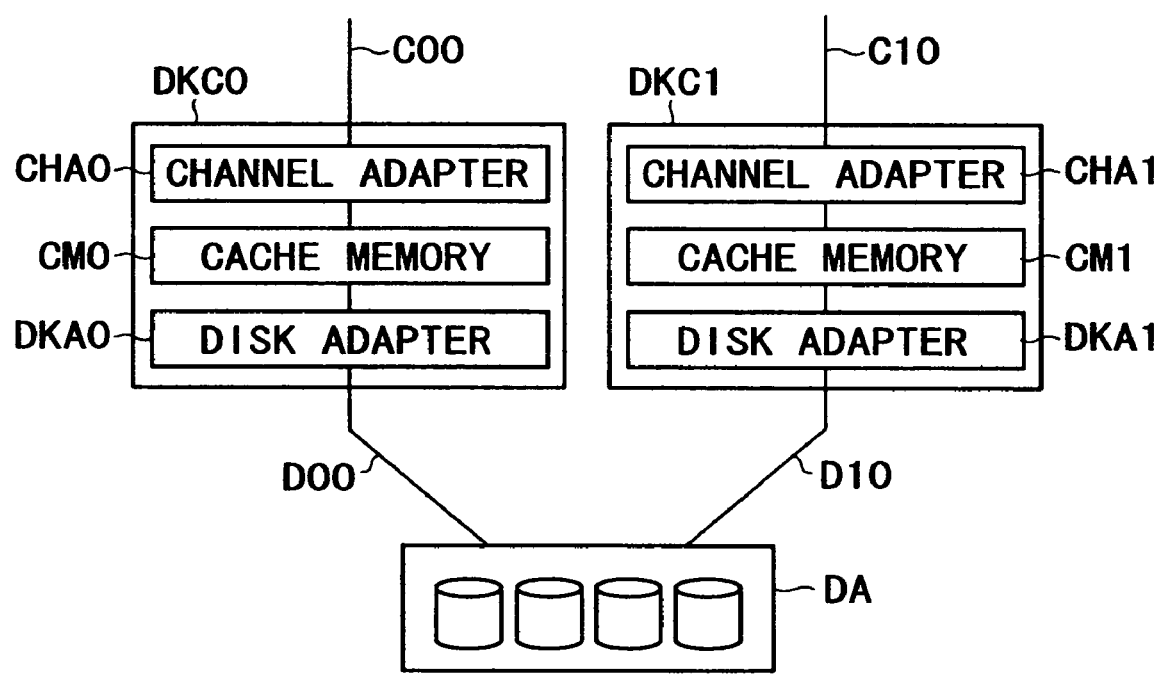

STORAGE DEVICE

CROSS-REFERENCE TO RELATED APPLICATION

The present invention claims priority from Japanese Application serial No. 2004-254509 filed on Sep. 1, 2004, the content of which is hereby incorporated by reference into this application.

BACKGROUND OF THE INVENTION

The present invention relates to a storage device and relates in particular to control for accessing storage areas shared among multiple disk controllers (DKC) containing cache memories in storage systems.

Current high-performance computer systems contain large-capacity secondary storage devices. Data required by the host device such as the CPU (central processing unit) is stored in the secondary storage device and is written into or read from the CPU (or other device) whenever needed. An nonvolatile storage medium is generally used as the secondary storage device. Typical secondary storage devices, for example, are disk devices such as magnetic disk devices or optical disks, etc.

In recent years, higher performance is being required of these disk devices due to advances in information processing. In response to higher performance, disk devices in particular need higher data input/output throughput and more disk drive units must be connected.

One method for improving the throughput in disk devices is to connect multiple disk controllers to a disk array, and to increase the number of ports connecting the host device with the cache memory capacity of the disk device.

One disk device of this type is disclosed for example in Japanese Published Unexamined Patent Application No. 2001-344188 wherein a disk array device with multiple disk drives shared among multiple controllers. This disclosed related art is hereinafter called the First related art.

Another method of the related art attempted in particular to increase the number of connected disk drive units is by means of the switch connection at the disk array connections to the disk controller within the disk device.

A switch for this type of switching connection is disclosed for example in Japanese Published Unexamined Patent Application No. 2003-196140. In this technology, the switch for accessing the storage area shared among multiple computers connected to that switch is an exclusive access control switch. Moreover, when a mismatch has occurred in the write-through cache memories within the multiple computers, the switch sends an instruction to the computers to invalidate the mismatch data. This disclosed related art is hereinafter called the Second related art.

FIG. 19 is a block diagram of the disk device of the related art containing multiple disk controllers. The disk device in FIG. 19 is made up of two units; two disk controllers DKC0, DKC1 and a disk array DA. The disk controller structure is described using DKC0 as an example. The disk controller DKC0 is made up of a channel adapter CHA0 for connecting the host CPU (not shown in drawing) with the disk device, a cache memory CM0 for temporarily storing the data to read and write on the disk array DA, and a disk adapter DKA0 for connecting the disk controller DKC0 and the disk array DA. A bus or a switch interconnects the channel adapter CHA0, and the cache memory CM0 and the disk adapter DKA0. The channel adapter CHA0 connects to the CPU via a channel C00. The disk adapter DKA0 connects to the disk array DA via a channel D00.

The write data inputted from the host CPU via the channel C00 is temporarily stored in the cache memory CM0. When the cache memory operation is set in the write-back, the disk controller DKC0 informs the host device that writing is complete when the write data has been stored in the cache memory. The disk controller DKC0 later sends the write data stored in the cache memory CM0 from the disk adapter DKA0 to the disk array DA via the channel D00.

When reading data, a check is made first of all whether the data is stored within the cache memory CM0. If the data is present, the stored data within the cache memory is sent from the cache memory CM0 via the channel adapter CHA0, to the host CPU. If there is no matching data within the cache memory CM0, the disk adapter DKA0 reads data from the disk array DA by way of the channel D00. The disk adapter DKA0 sends this read data via the channel adapter CHA0 to the host CPU. The disk controller DKC1 is made up of a channel adapter CHA1, a cache memory CM1, and a disk adapter DKA1, the same as the disk controller DKC0. The disk controller DKC1 is connected via channel C10 to the CPU (not shown in drawing) and connects to the disk array by way of a channel D10. The operation is the same as that of the disk controller DKC0.

The case where the disk array DA contains a shared volume is assumed next. The shared volume is a disk area capable of being commonly accessed from the multiple disk controllers. In the example in FIG. 19, the shared volume is a disk area capable of reading and writing (data) from either the disk controller DKC0 and DKC1.

One of the main problems with using this shared volume is that exclusive access control prohibits simultaneous writing by multiple disk controllers. Multiple disk controllers simultaneously writing on the same disk area might disable the data writing by any of the controllers so exclusive access control of writing onto the shared volume is required.

Another problem is maintenance of coherency (matching) among the cache memories within the multiple controllers. A cache memory mismatch may be considered as the following state. For example, when the disk controller DKC0 writes on the shared volume, the most recent data is stored inside the cache memory CM0 within the disk controller DKC0. However, that data is not stored within the cache memory CM1 inside the disk controller DKC1 so that a data mismatch occurs in the cache data of the area corresponding to the shared volume of the cache memory CM0 and the cache memory CM1.

An exclusive access control part is installed in each disk controller in the disk array device of the First related art. Signal lines for exclusive access control between each disk controller and for cache coherency control are installed between each disk controller. However, when there are an increased number of disk controllers accessing the shared volume, this method for installing exclusive access control parts in each of the disk controllers makes control more complex and causes higher costs because a larger number of parts are used.

No consideration was ever given in this storage system, to connecting a switch between the multiple disk controllers and the disk array, and using this switch to control the shared volume commonly used by the multiple disk controllers.

When the switch of the second related art is utilized to connect with the multiple disk controllers with the disk array, the exclusive access control is easier than in the first related art because exclusive access control by the switch is concentrated. However, consideration was only given to using the write-through type of cache memory for coherency control of the cache memory. Therefore, when using the method of the second related art, it is impossible to apply coherency (match) control in cache memories for disk controllers using the normal write-back method. The coherency control for the cache memory of the second related art discloses a method for invalidating non-matching data. However no method is disclosed for matching data among the cache memories.

SUMMARY OF THE INVENTION

In view of the problems with the related art, the present invention has an objective of providing a control method and a storage system implementing the control method to match data among cache memories sharing shared volumes, in storage systems capable of accessing the shared volumes formed in storage devices from multiple disk controllers containing cache memories.

The present invention is preferably a storage system containing multiple controllers (such as disk controllers) with cache memories, and storage devices for disk arrays containing specified areas such as shared volumes capable of being commonly accessed from multiple disk controllers, and a switch for switching the multiple disk controllers with the storage device, wherein the switch performs exclusive access control of data for the multiple disk controllers' writing on the shared volumes, and maintains data coherency except for data modified in the cache memories. In other words, the switch performs control for keeping cache data coherency in the contents of the shared volume for the cache memories of the multiple disk controllers.

The present invention is preferably a storage system with multiple controllers containing cache memories for temporarily storing data for accessing by a request from a host computer, and channel adapters connecting to the host computer, and a storage device containing shared areas capable of being commonly accessed from multiple controllers, and also containing unshared areas capable of being accessed from respectively predetermined controllers whose areas are each separately allocated to the multiple controllers, and a relay device containing multiple ports for connecting the multiple controllers with the storage device, a switch part for switching connections between the multiple ports, and a control part for controlling the switch part and the multiple ports, and the control part in the relay device decides whether or not the accessing of a storage device from the controller is for a shared area, and further decides whether the access request is a write request, if there is an accessible shared area, the ports and switch are controlled to transfer write data along with the write request to other controllers than the controller making the access request, and the other controllers form a storage system which stores the received write data in an area in their own cache memories corresponding to the shared area where invalid data is stored.

As an example, the storage device here contains a disk array containing unshared volumes as the unshared area, and a sub-disk device containing a shared area as the shared volumes; the relay device performs exclusive access control data writing from the multiple disk controllers on the shared volume. The sub-disk device performs coherency control to match data other than modified data on the cache memories within the multiple disk controllers.

The present invention performs coherency control to match data among the cache memories within the multiple controllers by a switch connecting the storage device with the multiple controllers to render the effect that scalability for the number of controllers accessing the shared volume is improved.

BRIEF DESCRIPTION OF THE DRAWINGS

FIG. 13 is an example of the cache memory management table stored in the disk controller;

FIG. 14 is an example of the cache memory management table stored in the switch SW;

FIG. 15 is an example of the shared volume management table stored in the switch SW;

FIG. 16 is an example of decision criteria for step 704;

FIG. 19 is a block diagram showing the structure of the disk device of the technology of the related art.

DESCRIPTION OF THE PREFERRED EMBODIMENTS

The embodiment of the present invention is hereafter described in detail while referring to the accompanying work drawings.

Figure 1:
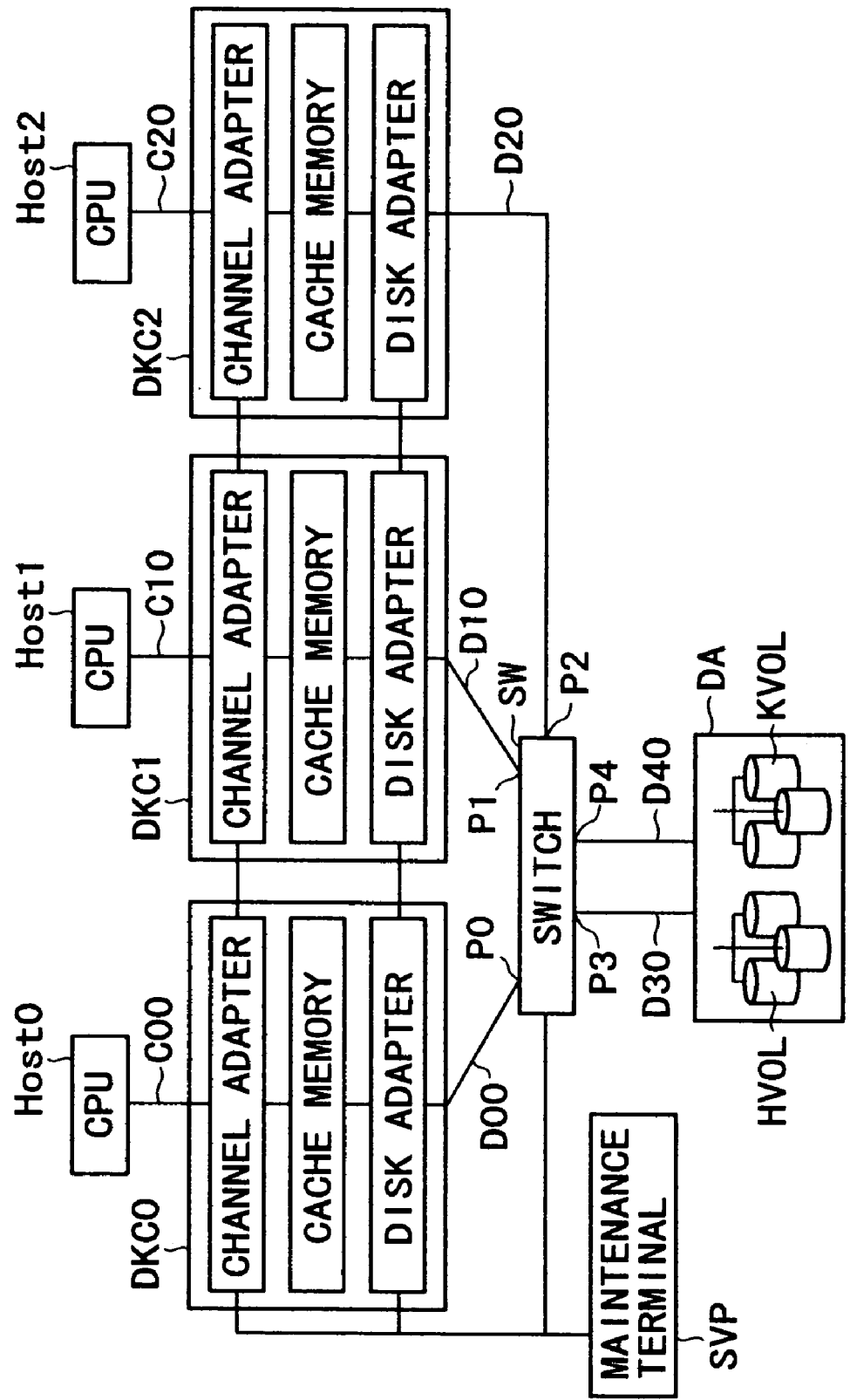
FIG. 1 is a block diagram showing a typical disk device of the present embodiment.

FIG. 1 is a block diagram showing the disk device of the present embodiment.

The disk device is made up of three disk controller units denoted as DKC0, DKC1 and DKC2, a disk array DA, and a switch SW connecting these components. In this embodiment, a Fibre Channel is utilized as the method for transferring data between the disk controller and switch, and between the switch and disk array. A maintenance terminal SVP is a terminal for entering management information for setting the switch SW and the disk controllers DKC0, DKC1 and DKC2. The structure in FIG. 1 includes three disk controller units, however there may be multiple disk controller units in the disk device and the number of disk controller units is not limited to three. The disk controllers DKC0, DKC1 and DKC2 are respectively connected by way of the respective communication paths C00, C10, C20 (hereafter called "channel") to the Host0, Host1 and Host2 as the host CPU (central processing unit).

The disk areas within the disk array DA are an unshared volume HVOL and a shared volume KVOL. The unshared volume is a disk area determined in advance as a volume for access by a disk controller. For example, the unshared volume assigned to the disk controller DKC0 cannot be accessed from the other disk controllers DKC1 and DKC2. In contrast, the shared volume is a disk area capable of being accessed from multiple disk controllers. In the present embodiment, the switch SW performs exclusive access control to exclude the multiple disk controllers from accessing the shared volume KVOL, and performs coherency control among the cache memories within the multiple disk controllers. The volume referred to here, is defined as actual or theoretical storage areas in one or multiple disk drives. Unless there are other restrictions this term refers to a theoretical volume. Usually, multiple defined volumes are formed on the disk array DA.

Figure 2:
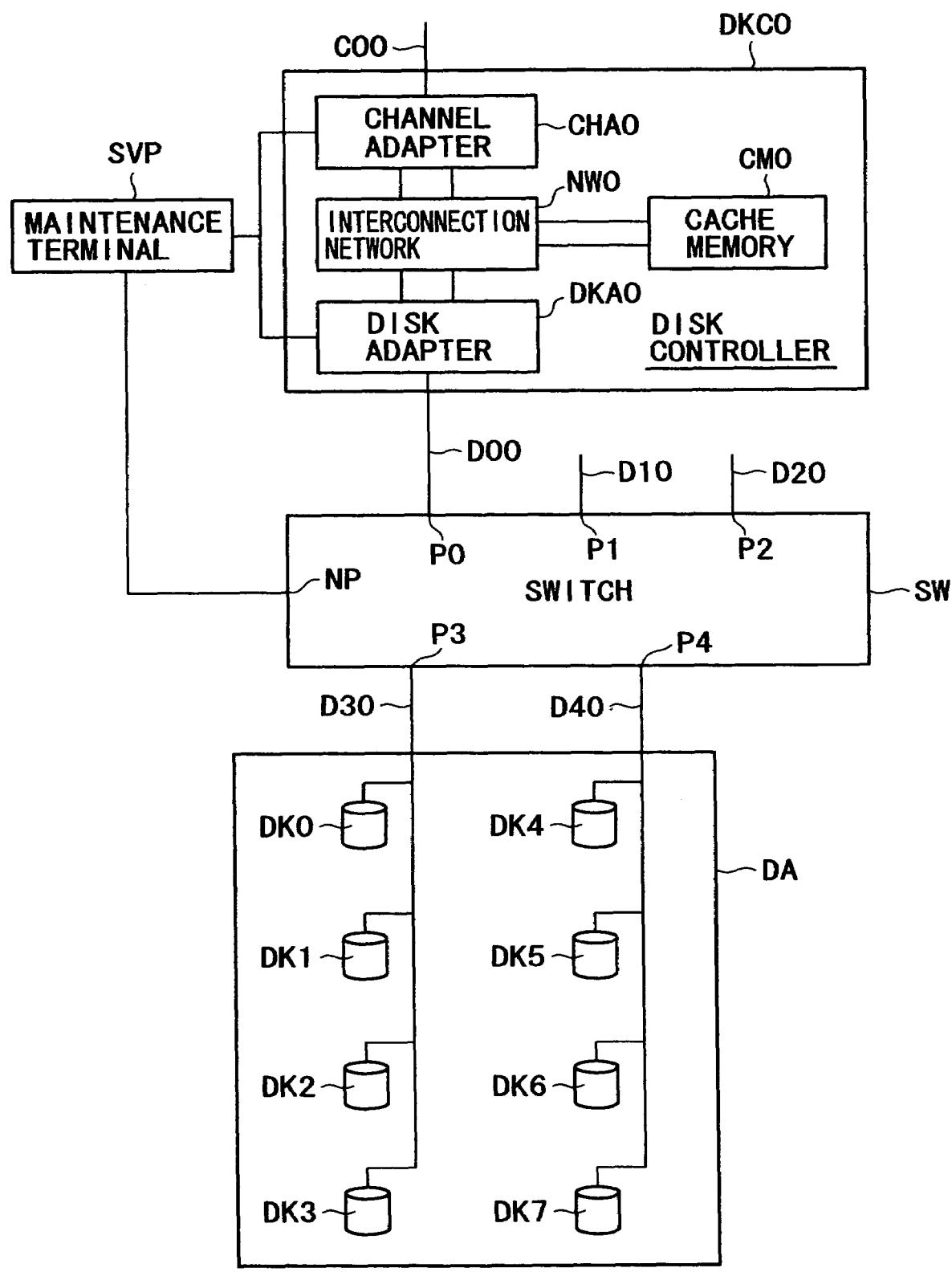
FIG. 2 is a block diagram showing the structure of the disk device of the present embodiment.

The internal structure of the disk device of the present embodiment is shown in FIG. 2. The structure of the disk controller DKC0 is shown here but the structures of the other disk controllers DKC1 and DKC2 are also identical.

The disk controller DKC0 includes a channel adapter CHA0, and a cache memory CM0, and a disk adapter DKA0. The channel adapter CHA0, the cache memory CM0 and the disk adapter DKA0 are interconnected by a interconnection network NW0. The channel adapter CHA0 is connected to the host device (not shown in drawing) via the channel C00.

The disk adapter DKA0 connects to the port P0 of the switch SW via the channel D00. The port P3 of the switch SW connects to the disk array DA via a channel D30, and the port P4 of the switch SW connects to the disk array DA via a channel D40. The other disk controllers DKC1 and DKC2 connect to the switch SW via the channels D10, D20. The maintenance terminal SVP connects with a port NP of the switch SW. The disk controller DKC0 and the switch SW can enter information settings from the maintenance terminal SVP.

The structure of the disk array DA in the present embodiment is described next. The disk array DA is a storage device made up of a disk array including four disk drives connected to the channel D30, and a disk array including four disk drives connected to the channel D40. The disk drives DK0, DK1, DK2, and DK3 are connected to the channel D30. Disk drives DK4, DK5, DK6, and DK7 are connected to the channel D40. The method for connecting numerous drives on one channel and accessing the disk drives in this way is called the Fibre Channel-arbitrated loop (FC-AL).

Figure 3:
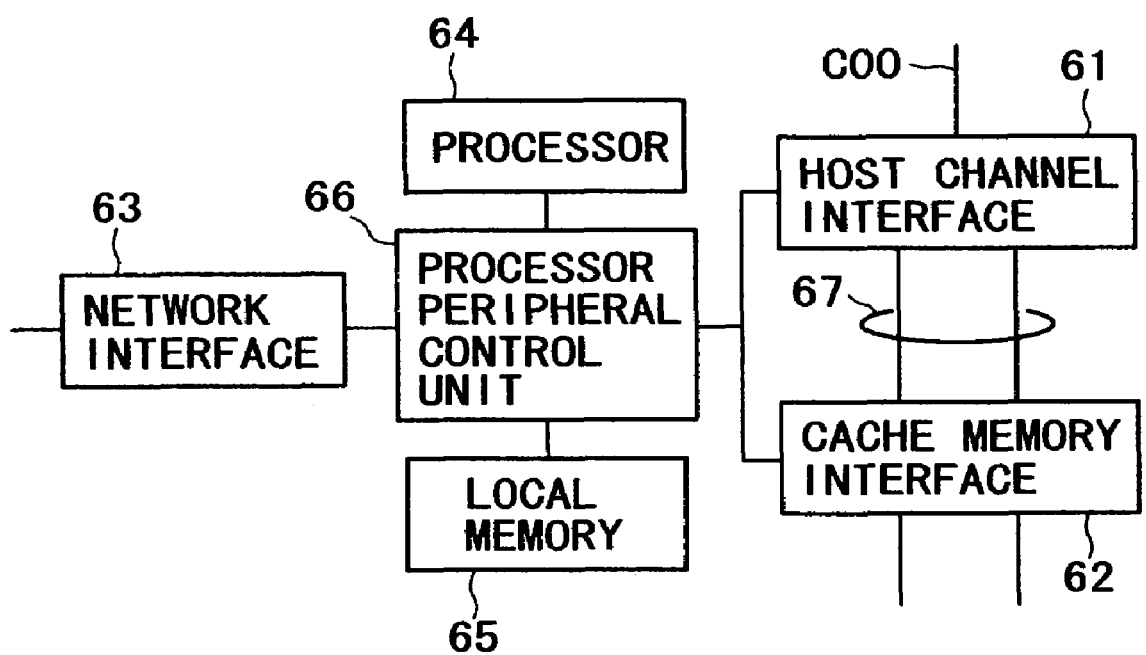
FIG. 3 is a block diagram showing the structure of the channel adapter CHA0.

The structure of the channel adapter CHA0 is shown in FIG. 3. The channel adapter CHA0 is made up of a host channel interface 61 connected to the channel C00, a cache memory interface 62 connecting to the interconnection network NW0, a network interface 63 for connecting to the maintenance terminal SVP, a processor 64 for controlling the transfer of data with the host devices, a local memory 65 for storing the different types of tables searched (or referred to) by the processor 64 and the software for execution, and a processor peripheral controller 66 for interconnecting these required components. A maintenance terminal SVP is used to monitor the different types of settings, changes referred to by the processors 64, 74 (described later) or the operating status of the disk devices, etc.

The host channel interface 61 contains a function for conversion between a data transfer protocol on the channel C00 and the data transfer protocol within the disk controller. The host channel interface 61 and the cache memory interface 62 are connected by a signal line 67.

Figure 4:
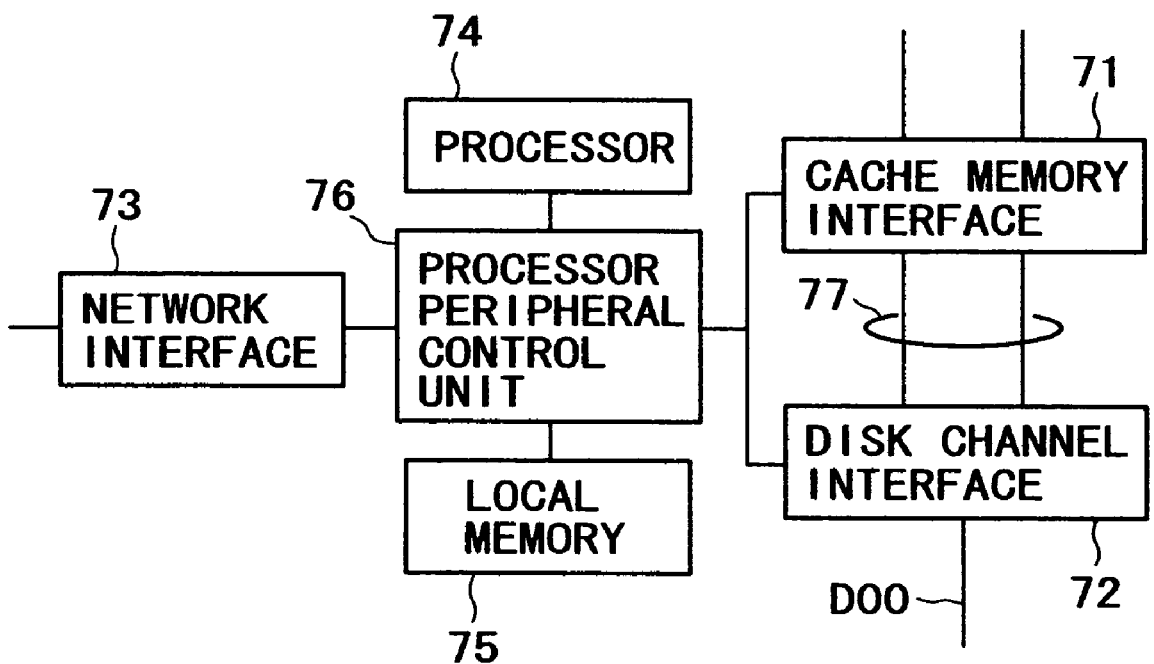
FIG. 4 is a block diagram showing the structure of the disk adapter DKA0.

FIG. 4 shows the structure of the disk adapter DKA0. The disk adapter DKA0 is made up of a cache memory interface 71 connected to the interconnection network NW0, a disk channel interface 72 connected to the disk channel D00, a network interface 73 for connecting to the maintenance terminal SVP, a processor 74, and a local memory 75 for storing the software to execute and the different types of tables referred to by the processor 74, and a processor peripheral control part 76 for interconnecting the required components.

A signal line 77 is connected between the cache memory interface 71 and the disk channel interface 72. The disk channel interface 72 contains a function for converting between a data transfer protocol internally in the disk controller and a data transfer protocol on the channel D00, for example the FCP-SCSI. In the above description, the disk controller structure included a disk adapter and a channel adapter. However, the disk controller may include other structures, for example, the disk controller may even a structure for processing the disk adapter and channel adapter on one control part, or a structure with processor independent of the disk adapter and channel adapter connecting each interface and processor with a switch.

Figure 5:
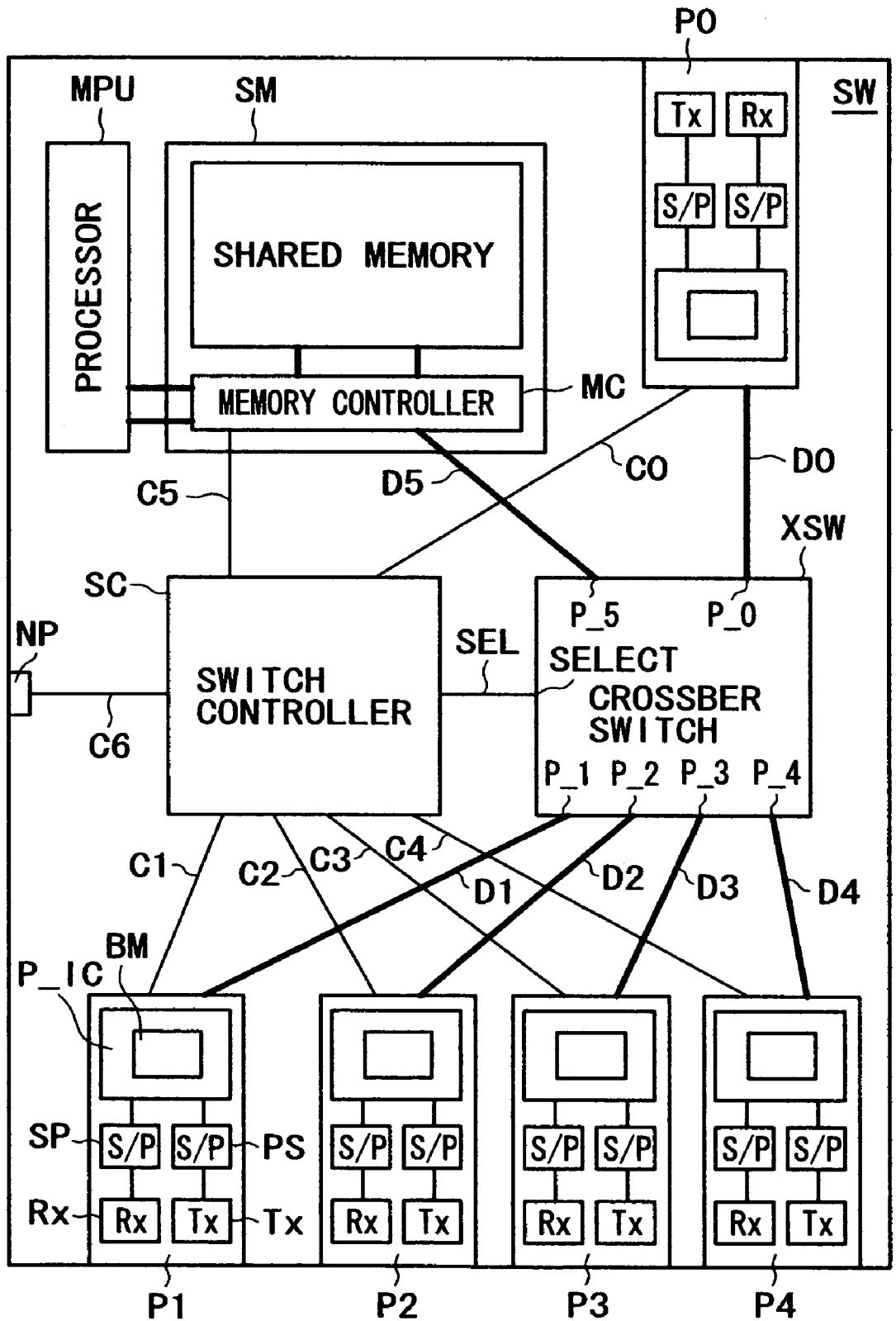
FIG. 5 is a block diagram showing the structure of the switch SW.

FIG. 5 shows the structure of the switch SW. The switch SW is a relay device for switching the connections among the multiple disk controllers DKC0 to DKC2 and the disk array DA. The switch SW structure and functions are described next. In the example in this embodiment, the switch SW possesses five ports P0, P1, P2, P3, and P4, a crossbar switch XSW, a switch controller SC and a shared memory SM. This switch XSW is a so-called shared memory type switch and each of the ports P0 through P5, connects to the shared memory via the internal bus or the internal switch, and exchanges frames between ports via the shared memory SM.

The ports P0 through P4 of the switch SW connect the ports P_0 through P_4 of the crossbar switch XSW with the respective signal lines D0 through D4. The shared memory SM connects the port P_5 of the crossbar switch XSW with the signal line D5. The ports P_0 through P_4 of the switch SW connect the switch controller SC with the respective signal lines C0 through C4. The shared memory SM connects the switch controller SC with the signal line C5.

Further, the switch controller SC and the port SELECT of the crossbar switch XSW connect to the signal line SEL. Also, the switch controller SC connects to the port NP of the switch SW via the signal line C6. The signal lines D0 through D5 are signal lines for sending and receiving the control signals and the frames sent and received between the ports P0 through P4 and the shared memory. The signal lines C0 through C5 are signal lines for sending and receiving frame header information between the ports P0 through P4 and the shared memory SM and the switch controller SC. The signal line SEL is a signal line for sending and receiving the switching control signals, to the crossbar switch XSW from the switch controller SC. The signal line C6 is a signal line for sending and receiving information settings from switch external volumes. The information settings for the ports P0 through P4 and the shared memory SM are distributed via the signal lines C0 through C5 from the switch controller SC.

The structure of the ports P0 through P4 for the switch SW is described next using a port P1 as an example. The port P1 includes a receiver Rx, a transmitter Tx, a serial-parallel converter SP, a parallel-serial converter PS, a protocol IC (integrated circuit) P_IC containing a buffer memory BM. The protocol IC P_IC is an integrated circuit implementing Fibre Channels FC-1 layer and FC-2 layer. The buffer memory BM is a memory for temporarily storing send/receive frames for the port to analyze frame headers, etc. The signal received by the receiver Rx is converted to a parallel signal in the serial-parallel converter SP and is inputted to the protocol ICP_IC. The signal output from the protocol ICP_IC is converted to a serial signal in the parallel-serial converter PS and sent outside the switch SW by the transmitter Tx.

Figure 6:
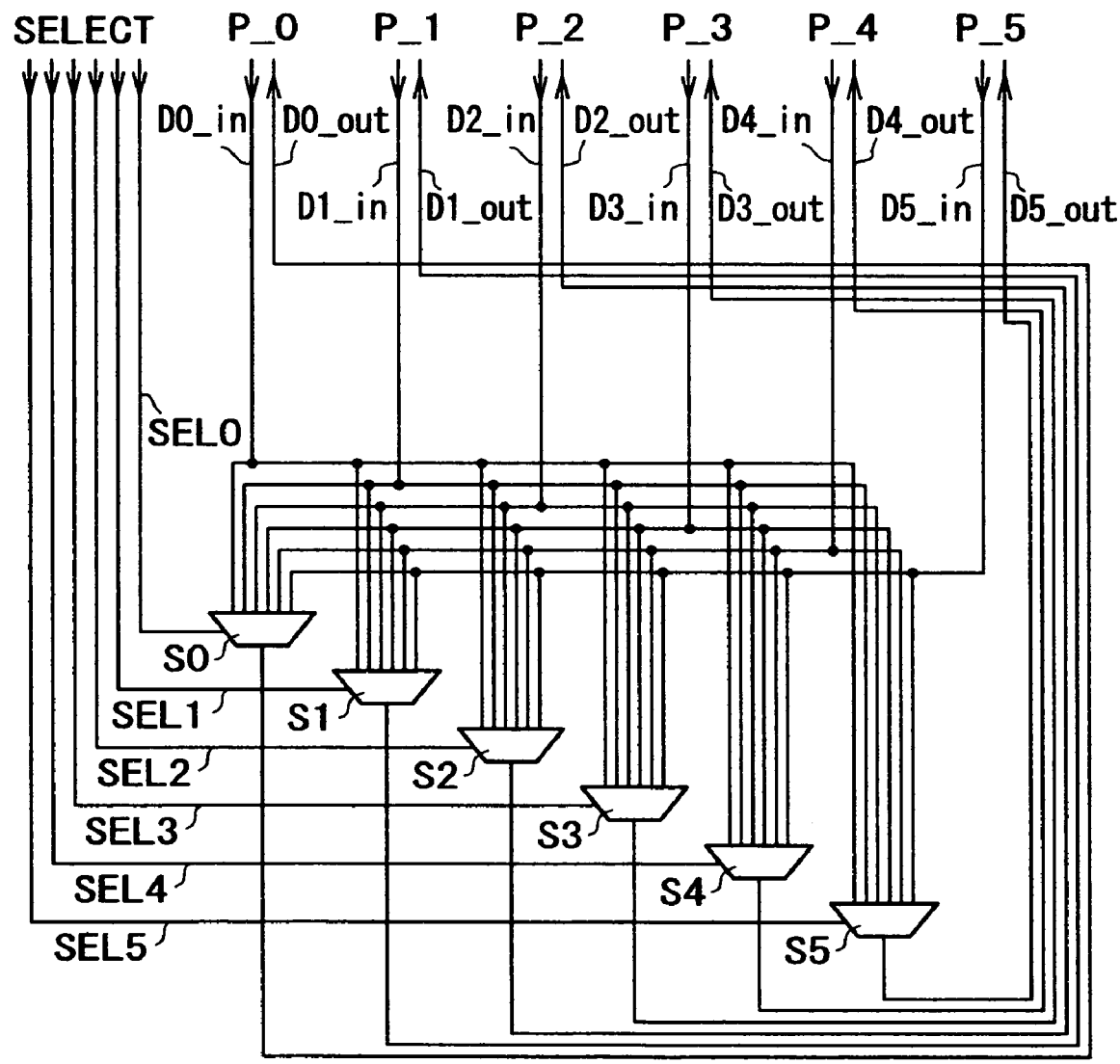
FIG. 6 is a schematic diagram showing the structure of the crossbar switch XSW.

FIG. 6 is a diagram showing the structure of the crossbar switch XSW. The crossbar switch XSW is made up of the selectors S0, S1, S2, S3, S4, and S5. The port SELECT and the selectors S0 through S5 are connected by the signal lines SEL0 through SEL5. The signal lines SEL0 through SEL5 here connect to the signal line SEL in FIG. 5. The ports P_0 through P_5 of the crossbar switch XSW are ports capable of transmit and receive. The receive signals are distributed to all selectors S0 through S5 by way of the signal lines D0_in through D5_in. The outputs from the selectors S0 through S5 connect to each of the crossbar switch XSW ports P_0 through P_5 by way of the signal lines D0_out through D5_out. The crossbar switch XSW makes the desired port connection by controlling the selectors S0 through S5 with the signals on the signal lines SEL0 through SEL5.

Exclusive access control of the shared volume by the switch SW, and the disk controller cache memory control method are described next while referring to the flowcharts in FIG. 7 through FIG. 12, and the management tables from FIG. 13 through FIG. 16. The management tables from FIG. 13 to FIG. 16 can be set and changed from the maintenance terminal SVP.

The control method is described as follows. The switch SW monitors the exchange between the disk controllers (DKC0 to DKC2) and the disk array DA. When write accessing to the shared volume KVOL is detected, the switch SW temporarily stores the frame in the shared memory SM within the switch SW. Except for the shared volume KVOL, most of the write exchanges and read exchanges are path changes made only by the crossbar XSW switch and are not made via the shared memory SM. After acquiring access rights to the shared volume KVOL, the frames temporarily stored within the shared memory SM are once again sent to the shared volume KVOL. The processor MPU sends the write data contained in the write exchange, to a disk controller that did not issue the write exchange, and this data is used in coherency control among the cache memories.

Figure 7:
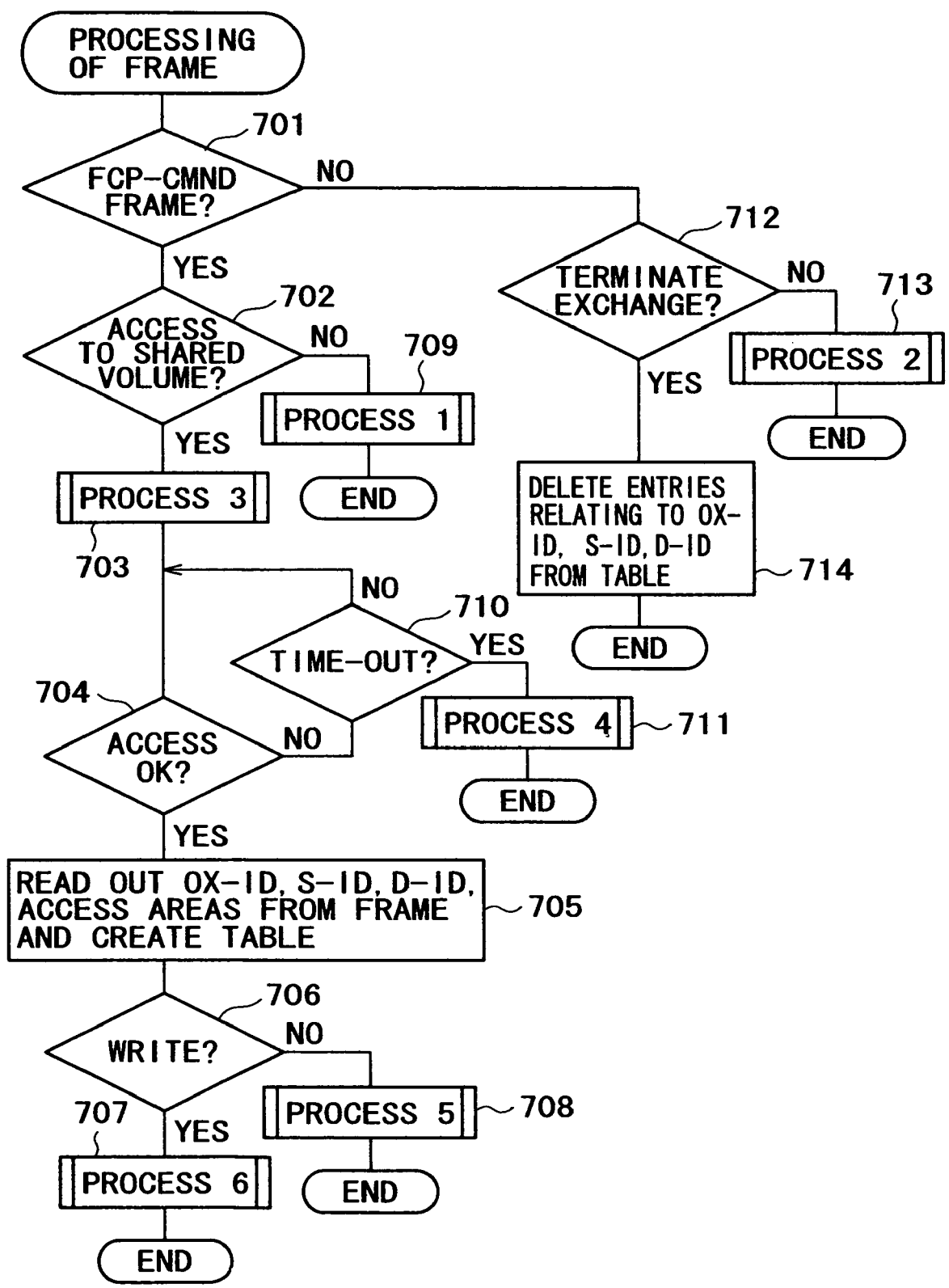
FIG. 7 is a typical flowchart showing switch SW control.

FIG. 7 is a flowchart showing an example of process for the frame by the switch SW. In step 701, the type of frame inputted to the port from a volume outside the switch is checked. If the frame is FCP-CMND then it proceeds to step 702. All other frames proceed to step 712.

In step 702, a decision is made whether the access is for the shared volume or not. The management table in FIG. 15 is checked in order to make this decision. The management table in FIG. 15 is retained in the shared memory SM. The shared volume is divided up into areas of appropriate sizes and numbers are assigned. Information such as the target ID 1502 for the disk drive, a logical unit number (LUN) 1503, a block address range 1504 consisting of a start block address and an end block address are stored in each of the corresponding shared volume area numbers 1501. If the access information stored in the FCP-CMND frame matches the area information recorded within the table of FIG. 15, then an exchange for accessing the shared volume is determined to have started. If the result from step 702 is NO, then the process proceeds to step 709. If the result from step 702 is YES, then the process proceeds to step 703.

Figure 8:
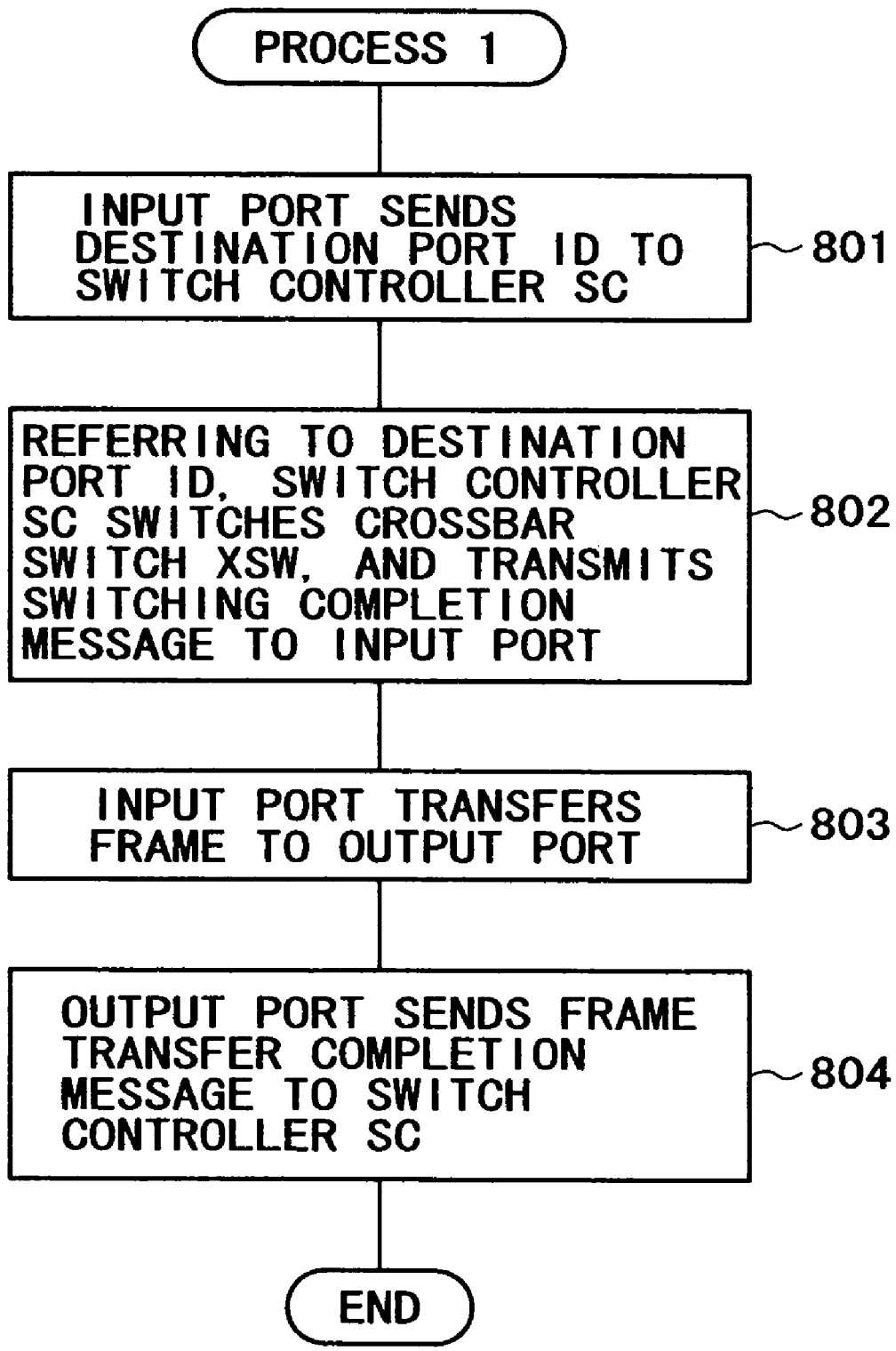
FIG. 8 is a flowchart showing the process 1 operation for switch SW control.

The process 1 shown in FIG. 8 is executed in step 709. If the decision from step 702 is NO, then the access is not for the shared volume and the path for the frame is changed by the crossbar switch XSW.

The process 1 is described next. In step 801 of FIG. 8, the input port extracts the destination port ID from the frame header and sends it to the switch controller. Next, in step 802, the switch controller SC changes (switches) the crossbar switch XSW according to the destination port ID. The switching completion is later on sent to the input port. Next in step 803, the input port transfers the frame to the output port. Finally in step 804, the output port sends the frame transmit completion to the switch controller SC. The process 1 then terminates.

Figure 10:
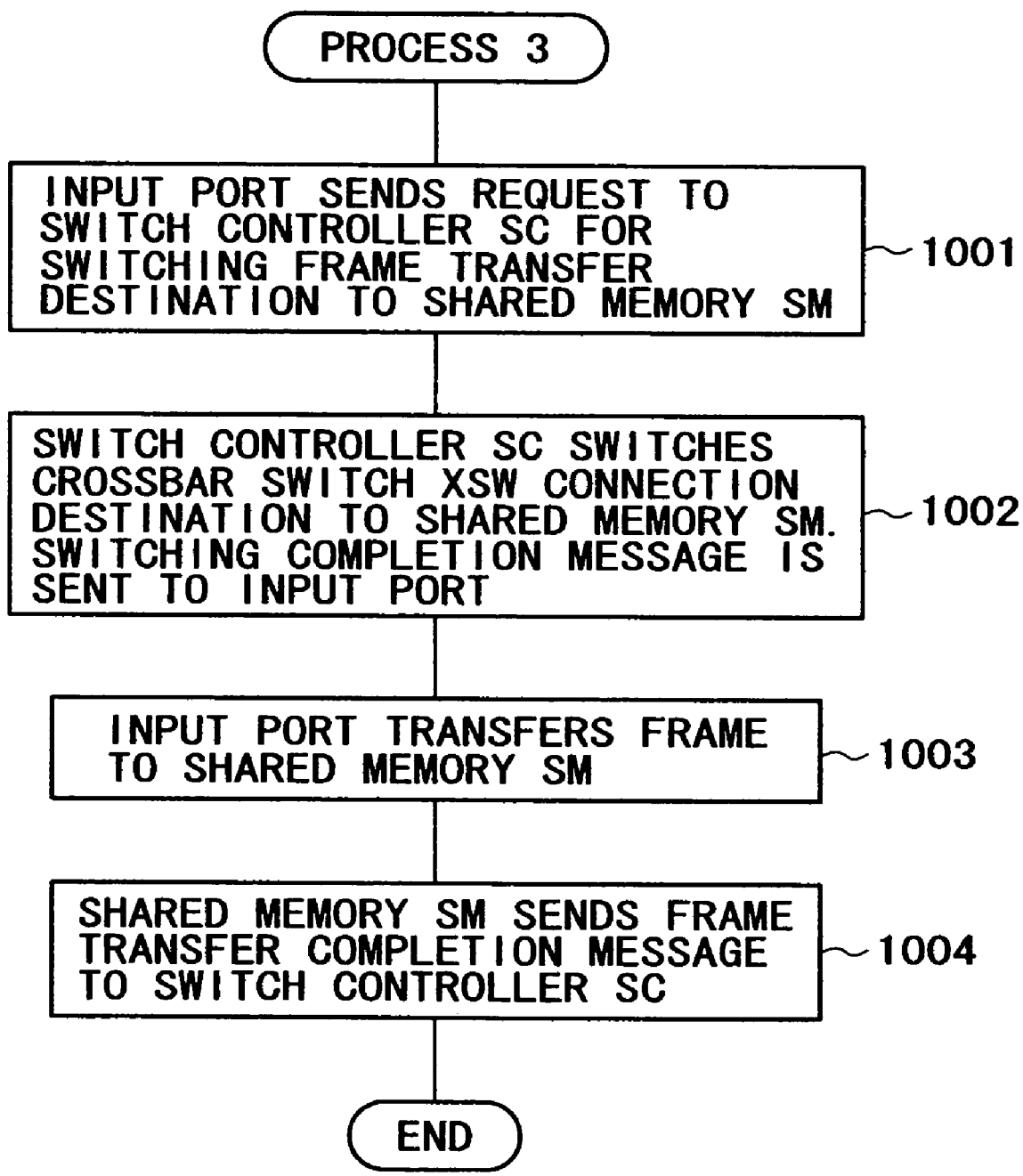
FIG. 10 is a flowchart showing the process 3 operation for switch SW control.

When the decision results from step 702 are a YES and the process proceeds to step 703, the process 3 of FIG. 10 is executed. The frame is then temporarily stored in the shared memory SM.

The process 3 is described next. In step 1001 in FIG. 10, the input port sends a request to the switch controller SC for switching the frame transfer destination to the shared memory SM. Next, in step 1002, the switch controller SC switches the connection destination on the crossbar switch XSW to the shared memory SM. The (notification of) completion of switching is sent to the input port. Next, in step 1003, the input port transfers the frame to the shared memory SM. Finally, in step 1004, the shared memory SM sends the frame transfer completion to the switch controller SC. The process 3 then terminates.

When process 3 of step 703 is terminated, the decision to permit or prohibit access to the shared volume is decided in step 704. To make this decision, the management table of FIG. 15 and the management table of FIG. 16 each held in the shared memory SM area are searched. Information on exchanges currently in progress are stored in the 1505, 1506 in FIG. 15. More specifically, this information is the read and write category (R/W), the exchange ID (OX-ID), the source port ID (S-ID), and the destination port ID (D-ID). The access allow/prohibit conditions are shown in FIG. 16. Whether to prohibit or allow access is decided according to the Read/Write type of exchange currently in progress, and the combination of read/write type for the new exchange that will start. First of all, the contents of the 1505, 1506 matching the area number of the access destination for the new exchange are verified. If there is no exchange currently in progress, then the conditions of 1601 in FIG. 16 are implemented and the decision result is YES. In other words, the shared volume can be accessed. Next, when there is an exchange currently in progress, access to the shared volume is allowed for the combination of 1602 or in other words, when the exchange currently in progress and the new exchange are both 'read'. However, when one or both of the exchange currently in progress and the new exchange are 'write', as in 1603, then access to the shared volume is prohibited.

In step 704 when NO (access prohibited) is decided, the process proceeds to step 710. Here, the frame is set on hold (standby) until the access rights are available. The timeout conditions are preferably set to a time shorter than the FCP-SCSI timeout. The process proceeds to step 711 at timeout and process 4 is executed.

Figure 11:
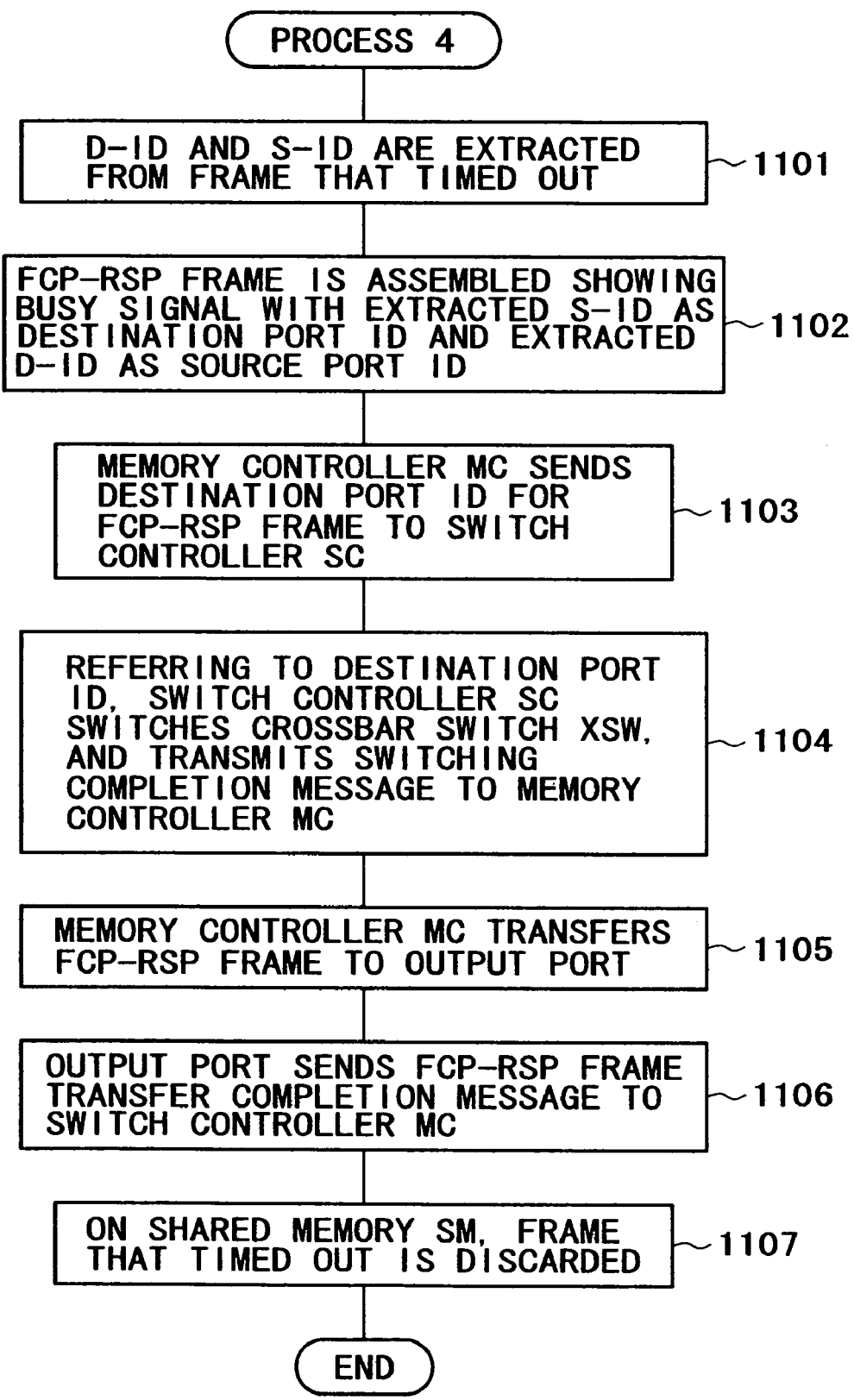
FIG. 11 is a flowchart showing the process 4 operation for switch SW control.

The process 4 is described next. The process 4 flowchart is shown in FIG. 11. The switch SW sends a busy notification to the disk adapter (initiator) within the disk controller, instead of the disk drive (target) serving as the original frame destination. This processing is executed by the processor MPU based on information in the frame temporarily stored in the shared memory. In step 1101 in FIG. 11, the destination port ID (D-ID) and source port ID (S-ID) are extracted from the frame after timeout. Next in step 1102, the extracted S-ID is set as the new destination port ID, and the extracted D-ID is set as the new source port ID, and an FCP-RSP frame showing the busy state is assembled. Next, in step 1103, the memory controller MC sends the transmit destination port ID for the FCP-RSP frame to the switch controller SC. In step 1104, the switch controller SC next switches the crossbar switch XSW according to the received destination port ID. The switching completion is sent to the memory controller MC. Next in step 1105, the memory controller MC transfers the FCP-RSP frame to the output port. In step 1106, the output port sends the FCP-RSP frame transfer completion to the switch controller SC. Finally in step 1107, the frame that timed out on the shared memory SM is discarded. The process 4 then terminates.

When the process has proceeded to step 705 after deciding in step 704 that access is allowed, the OX-ID, S-ID, D-ID, and shared volume access area are read out from the frame. The tables 1505 and 1506 of FIG. 15 are then created. In the case of condition 1602 of FIG. 16, the read exchange information is stored in 1505 and 1506 of FIG. 15. In the case of condition 1601, the read or the write exchange information is stored in 1505.

Next, in step 706, if the new exchange is a 'write', the process proceeds to step 707. In cases other than 'write' (in other words, 'read'), the process proceeds to step 708. In step 708, process 5 is executed.

Figure 12:
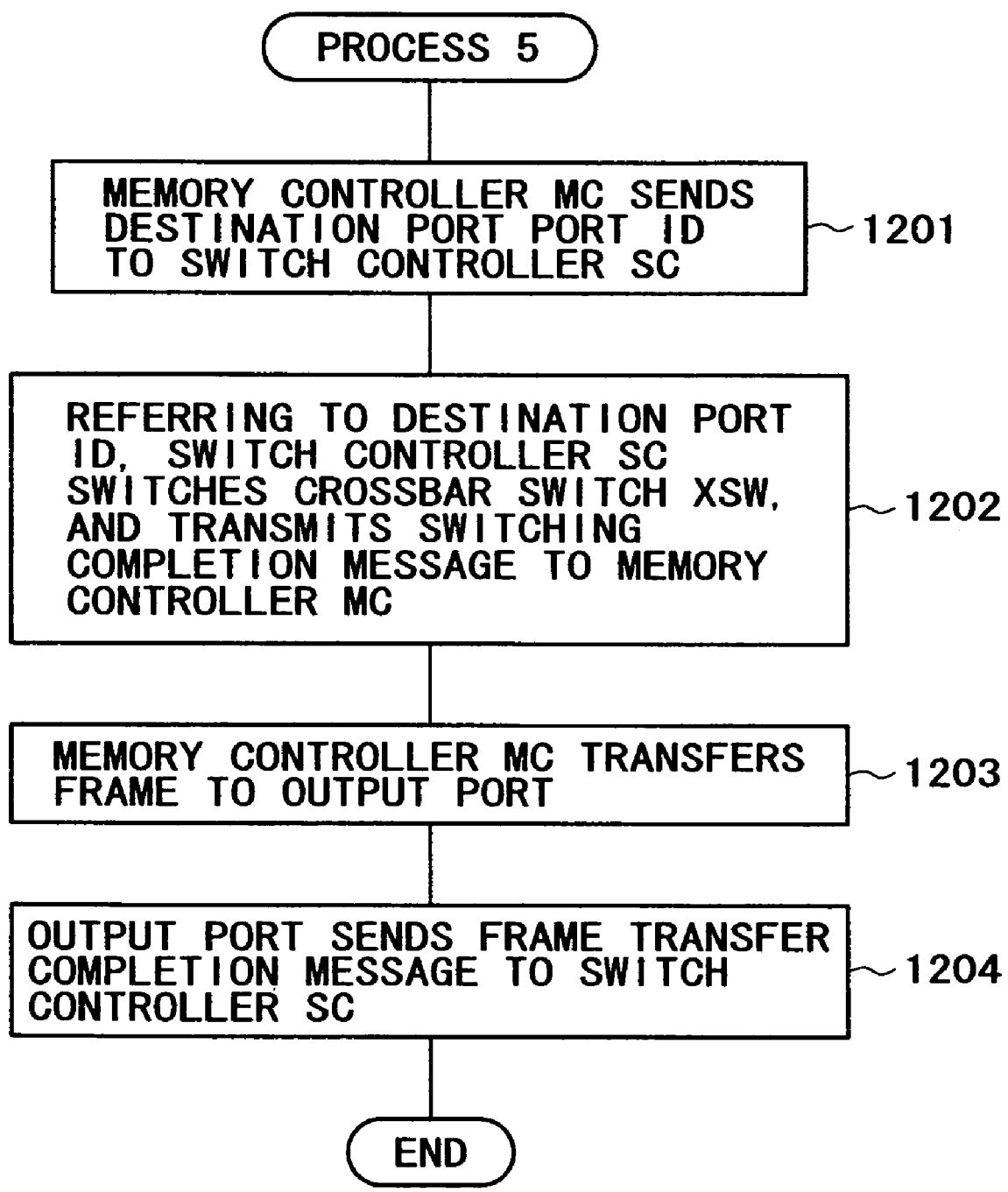
FIG. 12 is a flowchart showing the process 5 operation for switch SW control.

The process 5 is described next. In process 5 as shown in FIG. 12, the frame that was temporarily stored in the shared memory SM is sent to the original destination. In step 1201, the memory controller MC sends the destination port ID to the switch controller SC. Next in step 1202, the switch controller SC switches the crossbar switch XSW according to the destination port ID that was received. The switching completion is afterwards sent to the memory controller MC. Next in step 1203, the memory controller MC transfers the frame to the output port. Finally in step 1204, the output port sends the frame transfer completion to the switch controller SC. The process 5 then terminates.

In step 707, the process 6 is implemented to perform coherency control of the cache memory within the disk controller. In this case, the management tables are referred to as shown in FIG. 13 and FIG. 14. FIG. 13 shows the management table for the cache memory corresponding to the shared volume retained within the cache memory of the disk controller. A cache status 1302 and address range 1301 on the cache memory corresponding to the shared volume area number 1501 of FIG. 15 are stored in this table. The cache status 1302 shows three states; Clean, Dirty and Invalid. The Clean status indicates cache data already written on the disk. The Dirty status indicates cache data not written on the disk. The Invalid status indicates cache data that is not valid. FIG. 14 is a management table for operating the cache memory within the disk controller from the switch SW. The disk adapter is operated as an SCSI target device in order to allow the cache memory to be accessed from the switch. The target device space and the cache memory space are then mapped, and the switch is operated as a virtual initiator device so that the switch can access the cache memory. The target device space corresponding to the shared volume area of FIG. 15 for each disk controller is shown in FIG. 14. The target ID 1401, the logical unit number 1402, and the block address range 1403 for accessing the disk adapter within the disk controller are stored in the management table of FIG. 14 using the disk controller DKC0 as an example.

Figure 17:
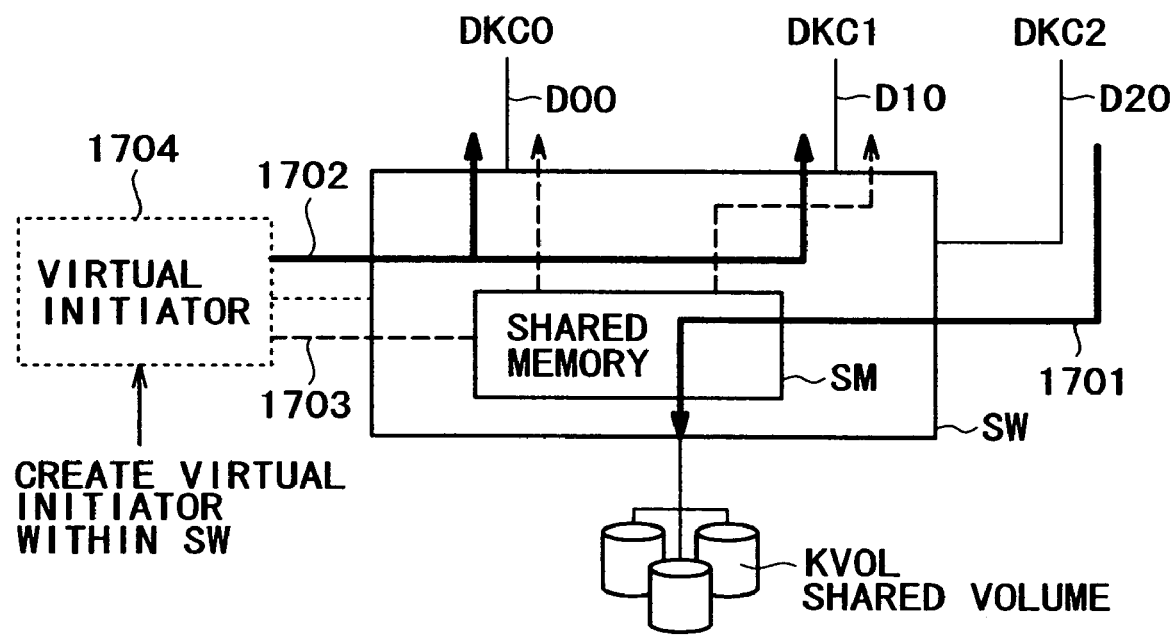
FIG. 17 is a block diagram showing an example of the operation of process 6.

The process 6 is described next. An example of the switching operation for the process 6 is shown in FIG. 17. The example in this figure, shows the case of the disk controller DKC2 write accessing the shared volume KVOL, and there is no accessing of the shared volume KVOL by the other controllers DKC0, DKC1. The switch SW makes a virtual initiator 1704 as a program operated by the processor MPU on the shared memory SM. After temporarily storing the Write exchange in the shared memory SM, the switch SW sends it to the shared volume KVOL (1701). The virtual initiator 1704 here is a program to be executed by the processor MPU on the shared memory SM, and it is also an initiator for issuing SCSI commands to the disk adapter within the disk controller as the target, and for requesting processing.

Following the flow in FIG. 7, when the switch SW detects write accessing of the shared volume, it issues a write command (1702) from the virtual initiator 1704 using the disk adapter within the disk controllers DKC0, DKC1 as the target. The disk controllers DKC0, DKC1, which received the write command from the virtual initiator 1704, change the Clean status cache data in the cache memory space for that write command, to Invalid status. Next, the virtual initiator 1704 sends the write data 1701 temporarily stored within the shared memory SM, to the disk adapter within the disk controllers DKC0, DKC1 (1703).

The disk controllers DKC0, DKC1, which received the write data, overwrites that data obtained from the switch, only onto data other than Dirty state data within the cache (in other words, invalid data). The status of the overwritten cache data is afterwards changed to the Clean state. Therefore there is no overwriting of the cache Dirty state data, so that data in the cache memory not yet saved onto the disk is retained by write-back operation onto the cache memory.

Data other than dirty status data is in this way matched with cache memory data within the disk controllers DKC0, DKC1, DKC2.

The disk controller locks the cache area during status changes and overwriting to prevent access from the host CPU, and then cancels that lock after the change of status or overwriting is complete.

After completing the process 6 in step 707, the frame within the shared memory SM is sent outside the switch using the same procedure as in the process 5 of FIG. 12.

Returning to the previous explanation, when the decision in step 701 is NO (not a FCP-CMND frame), a decision is made in step 712 to terminate the exchange. After terminating the exchange, the entries relating to the terminated exchange are deleted from the management table of FIG. 15.

Figure 9:
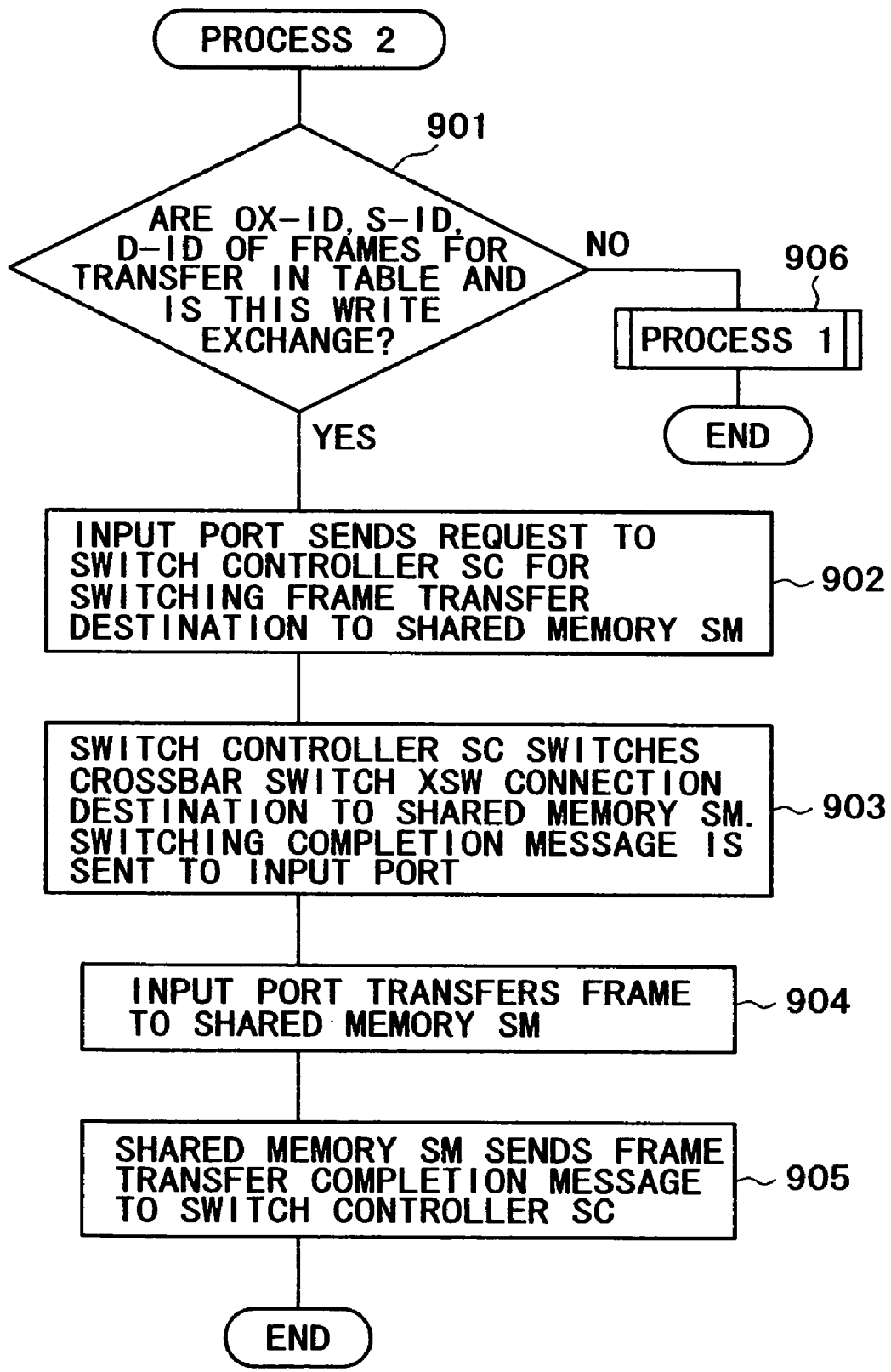
FIG. 9 is a flowchart showing the process 2 operation for switch SW control.

When the exchange in step 712 is in progress, the operation proceeds to step 713 and executes the process 2. The flowchart for the process 2 is shown in FIG. 9. In the process 2, control is implemented to establish a shared memory SM path only the frame belonging to the write exchange for that shared volume. The process 2 enables the frames using the shared memory SM to be limited to allow conserving the shared memory capacity. When the decision in step 901 is NO, the process 1 in step 906 is implemented in order to transfer frames not conveyed via the shared memory SM.

When the decision in step 901 is a YES, or in other words when via the shared memory SM, the process proceeds to step 902. In step 902, the input port sends a request to the switch controller SC, for switching the frame transfer destination to the shared memory SM. Next, in step 903, the switch controller SC switches the crossbar switch XSW connection destination to the shared memory SM. A notification of switching completion is later sent to the input port. In step 904, the input port transfers the frame to the shared memory SM. Finally, in step 905, the shared memory SM sends the frame transfer completion to the switch controller SC.

Figure 18:
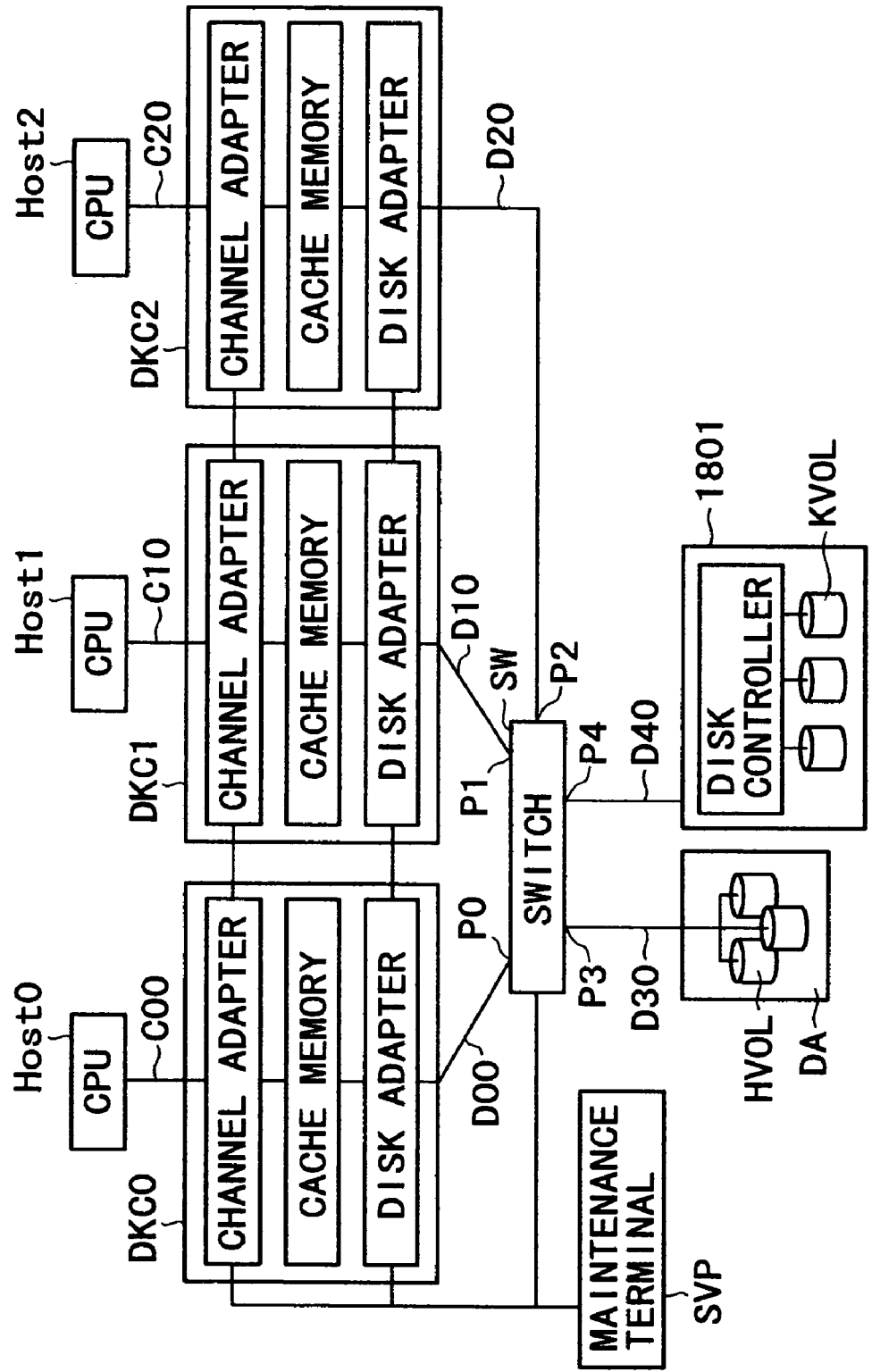
FIG. 18 is a block diagram showing the structure of the disk device of one embodiment.

The structure of the disk storage system of another embodiment is next described while referring to FIG. 18. The example in FIG. 18 shows the switch SW connected to a disk device containing a disk controller, as the shared volume KVOL. Besides an array DA containing an unshared volume HVOL, a sub-disk device 1801 containing a shared volume KVOL is connected to the switch SW as the storage device. The sub-disk device 1801 contains an internal disk controller, and can be utilized in a RAID configuration by means of disk drives including the shared volume KVOL. For example, a disk device containing a high-reliability and high-speed shared volume can be implemented at the shared volume KVOL at RAID level 5.

Among the switch SW functions in the disk device of FIG. 1, an exclusive access function for the shared volume can be retained in the switch SW, and the cache matching function can be implemented in the sub-disk device 180. In this case, the disk controller in the sub-disk device functions as an initiator and sends the data for writing onto the shared volume, to the disk controllers DKC0, DKC1, DKC2. By dispersing the load between the switch SW and the sub-disk device 1801, the overall performance of the disk device can be improved.

The disk device of these embodiments as described above is capable of maintaining cache memory coherency among the multiple disk controllers so that accessing of the shared volume is improved by increasing the number of disk controllers.

The present invention is not limited by these embodiments and can be achieved and applied in the form of different modifications or variations. For example, in the embodiments, the information was stored in management tables respectively shown in FIG. 13 or FIG. 16. However, the information in the invention is not limited by this example and other management information may also be added. The information stored in these management tables may be subdivided or may be unified among a number of other tables.

The term "table" is only a name given in these embodiments for the purpose of convenience. The term table need not be used in some cases and may be referred to as a database or simply information.

The structure of the switch SW shown in FIG. 5 is an example, and the invention is not limited by this example.

In the embodiments, coherency control of the cache memory for shared volumes was performed. However, the invention is not limited to these management units, and a fixed storage area may be utilized as the object for control.

What is claimed is:

1. A disk device, comprising:
multiple disk controllers containing channel adapters, cache memories and disk adapters, a disk array containing a shared volume capable of being commonly accessed from the multiple disk controllers, and a switch for switching connections between the multiple disk controllers and the disk array, wherein the switch performs exclusive access control of the multiple disk controllers' writing on the shared volume, and performs control to match data other than modified data among the cache memories within the multiple disk controllers for keeping coherency,
wherein when the switch receives a write access from one of the disk controllers to write on the shared volume, the switch temporarily stores write data in the memory inside the switch, and also sends the write data to other disk controllers not accessing the shared volume, and the disk controllers that received the write data, rewrite data other than modified data in the cache memory corresponding to the shared volume.

2. The disk device according to claim 1, wherein the switch sends the write data for SCSI write processing to the disk controller, with the switch as an initiator, and the disk adapter within the disk controller as a target for receiving the write data.

3. The disk device according to claim 2, wherein accessing the cache memory area corresponding to the shared volume is achieved by accessing the target.

4. A storage system, comprising:
multiple controllers containing channel adapters for connecting to host computers, and cache memories for temporarily storing data requested in accessing from the host computers;
a storage device containing shared areas capable of being commonly accessed from the multiple controllers, and an unshared area capable of being accessed from the predetermined controllers whose areas are each separately allocated to the multiple controllers;
a relay device containing multiple ports for connecting the multiple controllers with the storage device, and a switch part for switching connections between the multiple ports, a control part for controlling the switch part and the multiple ports,
wherein the control part in the relay device decides whether or not an access to the storage device from one of the controllers is for a shared area, and further decides whether a request for the access is a write request or not, and if the shared area is accessible, controls the ports and switch to transfer write data along with the write request to other controllers than the controller making the access request, and
the other controllers store the received write data in an area in their own cache memories corresnonding to the shared area where invalid data is stored,
wherein the storage device contains a disk array with an unshared volume as the unshared area, and a sub-disk device with a shared volume as the shared area,
the relay device performs exclusive access control for writing onto the shared volume from the multiple disk controllers, and
the sub-disk device performs matching control of data other than modified data among the cache memories within the multiple disk controllers for keeping coherency.

5. A storage system, comprising:
multiple controllers containing channel adapters for connecting to host computers, and cache memories for temporarily storing data requested in accessing from the host computers;
a storage device containing shared areas capable of being commonly accessed from the multiple controllers, and an unshared area capable of being accessed from the predetermined controllers whose areas are each separately allocated to the multiple controllers;
a relay device containing multiple ports for connecting the multiple controllers with the storage device, and a switch part for switching connections between the multiple ports, a control part for controlling the switch part and the multiple ports,
wherein the control part in the relay device decides whether or not an access to the storage device from one of the controllers is for a shared area, and further decides whether a request for the access is a write request or not, and if the shared area is accessible, controls the ports and switch to transfer write data along with the write request to other controllers than the controller making the access request, and
the other controllers store the received write data in an area in their own cache memories corresponding to the shared area where invalid data is stored,
wherein the storage system contains a maintenance terminal connected to the multiple controllers and the relay device, and the information settings relating to the shared areas for the controller and the relay device are set from the maintenance terminal.

6. A storage system, comprising:
multiple controllers containing channel adapters for connecting to host computers, and cache memories for temporarily storing data requested in accessing from the host computers;
a storage device containing shared areas capable of being commonly accessed from the multiple controllers, and an unshared area capable of being accessed from the predetermined controllers whose areas are each separately allocated to the multiple controllers;
a relay device containing multiple ports for connecting the multiple controllers with the storage device, and a switch part for switching connections between the multiple ports, a control part for controlling the switch part and the multiple ports,
wherein the control part in the relay device decides whether or not an access to the storage device from one of the controllers is for a shared area, and further decides whether a request for the access is a write request or not, and if the shared area is accessible, controls the ports and switch to transfer write data along with the write request to other controllers than the controller making the access request, and
the other controllers store the received write data in an area in their own cache memories corresponding to the shared area where invalid data is stored,
wherein the storage device contains a disk array with multiple logically defined volumes which are specified as shared volumes as the shared area and unshared volumes as the unshared area,
the relay device contains a memory for storing a management table stored with different types of information relating to a target ID of a disk drive, a logical unit number and a block address range corresponding to each number of the shared volumes, and
when accessed by one of the controllers, a decision is made whether or not to access the shared volumes by referring to information stored in the management table.

7. An access control method for storage devices in a system where multiple disk controllers containing cache memories share a storage device, comprising the steps of:
switching to change connection paths between the disk controller and the storage device, and connecting a selected disk controller and the storage device;
deciding whether one of the disk controllers can access the storage device in a predetermined shared area;
deciding whether an access request is a write request,
if decided that an access to the shared area is allowed and the request is a write request, transferring write data along with the write request to the other controllers than the disk controller making the access request, and
in the other disk controllers, storing the received write data in an area in their own cache memories corresponding to the shared area where invalid data is stored,
wherein the disk controllers manage statuses of data stored in their own cache memories, and overwrite the write data transferred from one of the disk controllers onto areas of the cache memories with statuses showing invalid data and/or data of which writing onto the shared area is complete in order to update storage contents of the area.

8. An access control method for storage devices in a system where multiple disk controllers containing cache memories share a storage device, comprising the steps of:
switching to change connection paths between the disk controller and the storage device, and connecting a selected disk controller and the storage device;
deciding whether one of the disk controllers can access the storage device in a predetermined shared area;
deciding whether an access request is a write request,
if decided that an access to the shared area is allowed and the request is a write request, transferring write data along with the write request to the other controllers than the disk controller making the access request, and
in the other disk controllers, storing the received write data in an area in their own cache memories corresponding to the shared area where invalid data is stored,
wherein the shared memory formed in the switch contains a management table stored with different types of information relating to a target ID of a disk drive, a logical unit number and a block address range corresponding to each number of the shared volumes logically defined in the shared area, and
when accessed by one of the disk controllers, a decision is made whether or not to access the shared volumes by referring to information stored in the management table.

9. An access control method for storage devices in a system where multiple disk controllers containing cache memories share a storage device, comprising the steps of:
switching to change connection paths between the disk controller and the storage device, and connecting a selected disk controller and the storage device;
deciding whether one of the disk controllers can access the storage device in a predetermined shared area;
deciding whether an access request is a write request,
if decided that an access to the shared area is allowed and the request is a write request, transferring write data along with the write request to the other controllers than the disk controller making the access request, and
in the other disk controllers, storing the received write data in an area in their own cache memories corresponding to the shared area where invalid data is stored,
wherein when deciding to allow or prohibit an access to the shared area, read and write types from information on exchanges currently in progress in the shared area and information on an exchange newly issued from the disk controllers are collated, and when collation results show that both exchanges are read exchanges, then the access to the shared area is allowed, and when results are that at least one of the exchanges is a write exchange, then the access to the shared area is prohibited.

10. The access control method according to claim 9, wherein if decided that access is prohibited, it is monitored for a specified time whether access to the shared area is allowed, and after a specified time has elapsed, write frame data held within the memory of the switch is discarded.

11. A cache memory management method in a disk system, the disk system comprising:

multiple disk controllers containing channel adapters for connecting to host computers, and cache memories for temporarily storing data requested from the host computers, and disk adapters;

a disk array containing shared volumes capable of being commonly accessed from the multiple disk controllers, and unshared volumes capable of being accessed from the predetermined disk controllers whose volumes are each separately allocated to the multiple disk controllers; and a switch for switching connections between the multiple disk controllers and the disk array, the switch containing multiple ports for connecting the disk array with the multiple disk controllers, a crossbar switch for switching and connecting the multiple ports, a shared memory for temporarily storing write data from the multiple disk controllers on the shared volumes, and a switch controller for controlling the multiple ports, the crossbar switch and the shared memory, wherein the shared memory contains a management table stored with different types of information relating to a data target ID of a disk drive, a logical unit number and a block address range corresponding to each number of the shared volumes, when the switch receives an access request from one of the disk controllers, the switch temporarily stores data relating to the access request transferred from the disk controller that issued the access request into the shared memories, decides whether an access to the shared volumes is possible by referring to the management table stored in the shared memory, and also decides if the access request is a write request, and if the decision results are that an access to the shared area is possible and if the request is a write request, the switch controller controls the shared memory, the ports and the crossbar switch, and sends a command to invalidate the written data in a cache memory area corresponding to the shared volumes to the other disk controllers than the disk controller that issued the write request, and also sends the write data stored in the shared memory to the other disk controllers, and the other disk controllers that received the write data overwrite the received write data on a location in the cache memory corresponding to the shared volumes where data other than modified data is stored, and update stored contents of the cache memory.

* * * * *